United States Patent
Sasaki et al.

(10) Patent No.: US 10,926,217 B2
(45) Date of Patent: Feb. 23, 2021

(54) SHIP DESULFURIZATION DEVICE AND SHIP EQUIPPED WITH SHIP DESULFURIZATION DEVICE

(71) Applicants: Mitsubishi Hitachi Power Systems, Ltd., Yokohama (JP); MITSUBISHI SHIPBUILDING CO., LTD., Yokohama (JP)

(72) Inventors: Ryozo Sasaki, Yokohama (JP); Tetsu Ushiku, Yokohama (JP); Satoru Sugita, Yokohama (JP); Tatsuto Nagayasu, Yokohama (JP); Seiji Kagawa, Tokyo (JP); Naoyuki Kamiyama, Tokyo (JP); Yusuke Watanabe, Tokyo (JP)

(73) Assignees: Mitsubishi Power, Ltd., Yokohama (JP); Mitsubishi Shipbuilding Co., Ltd., Yokohama (JP)

( * ) Notice: Subject to any disclaimer, the term of this patent is extended or adjusted under 35 U.S.C. 154(b) by 38 days.

(21) Appl. No.: 16/479,111

(22) PCT Filed: Jan. 27, 2017

(86) PCT No.: PCT/JP2017/002936
§ 371 (c)(1),
(2) Date: Jul. 18, 2019

(87) PCT Pub. No.: WO2018/135010
PCT Pub. Date: Jul. 26, 2018

(65) Prior Publication Data
US 2020/0406185 A1 Dec. 31, 2020

(30) Foreign Application Priority Data
Jan. 20, 2017 (JP) .............................. JP2017-008842

(51) Int. Cl.
*B01D 53/50* (2006.01)
*B01D 53/18* (2006.01)

(52) U.S. Cl.
CPC ........... *B01D 53/504* (2013.01); *B01D 53/18* (2013.01); *B01D 2252/1035* (2013.01);
(Continued)

(58) Field of Classification Search
CPC ...... B01D 53/50; B01D 53/18; B01D 53/501; B01D 53/504; B01D 53/78;
(Continued)

(56) References Cited

U.S. PATENT DOCUMENTS 4,269,812 A 5/1981 Edwards et al.
4,343,771 A 8/1982 Edwards et al.
(Continued)

FOREIGN PATENT DOCUMENTS

CN 104919151 A 9/2015
EP 2 955 345 A1 12/2015
(Continued)

OTHER PUBLICATIONS

Office Action dated Jul. 4, 2019, issued in counterpart CN application No. 201780008882.8, with English translation. (16 pages).
(Continued)

*Primary Examiner* — Timothy C Vanoy
(74) *Attorney, Agent, or Firm* — Westerman, Hattori, Daniels & Adrian, LLP

(57) ABSTRACT

A ship desulfurization device for desulfurizing exhaust gas discharged from an exhaust gas generation device mounted to a ship includes: an absorber including an absorber body unit defining an interior space having a longitudinal direction and having an exhaust gas introducing port formed on an end portion of the absorber body unit with respect to the longitudinal direction, the exhaust gas introducing port
(Continued)

being in communication with the interior space; and an exhaust gas introducing device for introducing exhaust gas discharged from the exhaust gas generation device to the absorber body unit. When L is a maximum length of the interior space of the absorber body unit with respect to the longitudinal direction, and W is a maximum width of the interior space of the absorber body unit with respect to a lateral direction that is orthogonal to the longitudinal direction, a ratio (W:L) of the maximum width W to the maximum length L is within a range of 1:over 1.1 and 1:6.0 or under 6.0.

16 Claims, 11 Drawing Sheets

(52) U.S. Cl.
CPC .... *B01D 2258/012* (2013.01); *F01N 2590/02* (2013.01); *F01N 2610/1453* (2013.01)

(58) Field of Classification Search
CPC .......... B01D 2221/08; B01D 2258/012; B01D 2258/01; B01J 2219/19; B01J 2219/1923; F01N 3/00; F01N 3/04; F01N 3/085; F01N 3/24; F01N 13/004; F01N 2570/04; F01N 2590/02
See application file for complete search history.

(56) References Cited

U.S. PATENT DOCUMENTS

| | | | |
|---|---|---|---|
| 8,940,079 | B2 | 1/2015 | McClelland |
| 10,563,553 | B2* | 2/2020 | Bahadur Thapa ....... F23J 15/04 |
| 2010/0266472 | A1 | 10/2010 | Peng |
| 2016/0016109 | A1* | 1/2016 | Strandberg ............... F23J 15/04 423/243.08 |

FOREIGN PATENT DOCUMENTS

| | | |
|---|---|---|
| EP | 2 998 529 A1 | 3/2016 |
| JP | 48-32771 A | 5/1973 |
| JP | 56-21628 A | 2/1981 |
| JP | 59-128913 A | 7/1984 |
| JP | 6-285328 A | 10/1994 |
| JP | 9-239233 A | 9/1997 |
| JP | 9-239237 A | 9/1997 |
| JP | 2001-149746 A | 6/2001 |
| JP | 3637140 B2 | 4/2005 |
| JP | 2010-269690 A | 12/2010 |
| JP | 2013-208958 A | 10/2013 |
| JP | 5631985 B2 | 11/2014 |
| JP | 2016-137766 A | 8/2016 |
| JP | 2016-172205 A | 9/2016 |
| KR | 10-2010-0076152 A | 7/2010 |
| KR | 10-2016-0016093 A | 2/2016 |
| KR | 20-0479610 U | 2/2016 |

OTHER PUBLICATIONS

Notification of Transmittal of Translation of the International Preliminary Report on Patentability (Form PCT/IB/338) issued in counterpart International application No. PCT/JP2017/002936 dated Aug. 1, 2019 with Forms PCT/IB/326, PCT/IB/373 and PCT/ISA/237, with English translation. (16 pages).
"Environmental and Industrial Gas Purification Technology", Chemical Industry Press Co., Ltd., (May 31, 2001), p. 396, cited in CN Office Action dated Jul. 4, 2019. (15 pages).
Office Action dated Jan. 13, 2020, issued in counterpart CN Application No. 201780008882.8, with English translation (15 pages).
International Search Report dated Mar. 21, 2017, issued in counterpart International Application No. PCT/JP2017/002936, with English Translation. (5 pages).
Office Action dated Jan. 2, 2019, issued in counterpart of CN Patent Application No. 201780008882.8, with English Translation. (15 pages).
Notification of Reasons for Refusal dated Sep. 12, 2018, issued in counterpart of KR Patent Application No. 10-2018-7022030, with English Translation. (27 pages).
Decision to Grant a Patent dated Feb. 17, 2017, issued in counterpart of JP Patent Application No. 2017-008842, with English Translation. (5 pages).
"Andritz and TeamTec sign cooperation agreement for worldwide marketing of the SeaSOx exhaust gas cleaning system for the maritime industry", Nov. 24, 2016, Cited in KR Notification of Reason for Refusal. (2 pages).
"Hybrid Scrubber System", retrieved from Internet: https://youtu.be/-jtTvyxfaiM, Sep. 10, 2014. Cited in KR Notification of Reason for Refusal. (1 page).
"Saacke SOx Scrubber System (ECGS-HM Exhaust Gas Cleaning System)", retrieved from Internet: https://youtu.be/BIRDUskEnYs, Dec. 11, 2015. Cited in KR Notification of Reason for Refusal. (1 page).
Notification of Reasons for Refusal dated Apr. 2, 2019, issued in counterpart of KR Patent Application No. 10-2018-7022030, with English Translation. (15 pages).
"Andritz AG Brochure, Andritz SeaSOx, Exhaust gas cleaning systems for the maritime industry", Dec. 31, 2016. Cited in KR Notification of Reasons for Refusal. (8 pages).
"Tri-Mer® Crossflow scrubbers", Dec. 31, 2003. Cited in KR Notification of Reasons for Refusal. (8 pages).
Office Action dated Jan. 3, 2020, issued in counterpart KR Application No. 10-2019-7019514, with English translation (15 pages).
Rejection Decision dated May 6, 2020, issued in counterpart CN Application No. 201780008882.8 (5 pages).
Office Action dated Feb. 11, 2020, issued in counterpart KR Application No. 10-2018-7022030, with English machine translation. (14 pages).
Office Action dated Oct. 18, 2019, issued in counterpart KR application No. 10-2018-7022030, with English translation. (11 pages).
Extended (Supplementary) European Search Report dated Aug. 19, 2020, issued in counterpart application No. 17893146.5. (8 pages).

* cited by examiner

40FT CONTAINER DIMENSIONS

FIG. 6A  NECESSARY ABSORBER AREA: 24m²
EQUIVALENT DIAMETER (D): 5.53m

| (W) × (L) | (W) : (L) | W/D | ARRANGE-MENT | DESULFU-RIZATION | COMPREHENSIVE EVALUATION |
|---|---|---|---|---|---|
| 1.5m × 16.0m | 1 : 10.67 | 0.27 | A | D | FAIL |
| 2.0m × 12.0m | 1 : 6.00 | 0.36 | A | C | PASSABLE |
| 3.0m × 8.0m | 1 : 2.67 | 0.54 | B | B | GOOD |
| 3.5m × 6.9m | 1 : 1.96 | 0.63 | B | A | EXCELLENT |
| 4.0m × 6.0m | 1 : 1.50 | 0.72 | B | A | EXCELLENT |
| 4.5m × 5.3m | 1 : 1.19 | 0.81 | C | A | PASSABLE |
| 5.0m × 4.8m | 1 : 0.96 | 0.90 | D | A | FAIL |

FIG. 6B  NECESSARY ABSORBER AREA: 32m²
EQUIVALENT DIAMETER (D): 6.38m

| (W) × (L) | (W) : (L) | W/D | ARRANGE-MENT | DESULFU-RIZATION | COMPREHENSIVE EVALUATION |
|---|---|---|---|---|---|
| 2.0m × 16.0m | 1 : 8.00 | 0.31 | A | D | FAIL |
| 3.0m × 10.7m | 1 : 3.56 | 0.47 | A | C | PASSABLE |
| 3.5m × 9.1m | 1 : 2.61 | 0.55 | B | B | GOOD |
| 4.0m × 8.0m | 1 : 2.00 | 0.63 | B | B | GOOD |
| 4.5m × 7.1m | 1 : 1.58 | 0.70 | B | A | EXCELLENT |
| 5.0m × 6.4m | 1 : 1.28 | 0.78 | C | A | PASSABLE |
| 6.0m × 5.3m | 1 : 0.89 | 0.94 | D | A | FAIL |

FIG. 6C  NECESSARY ABSORBER AREA: 48m²
EQUIVALENT DIAMETER (D): 7.82m

| (W) × (L) | (W) : (L) | W/D | ARRANGE-MENT | DESULFU-RIZATION | COMPREHENSIVE EVALUATION |
|---|---|---|---|---|---|
| 2.5m × 19.2m | 1 : 7.68 | 0.32 | A | D | FAIL |
| 3.0m × 16.0m | 1 : 5.33 | 0.38 | A | C | PASSABLE |
| 3.5m × 13.7m | 1 : 3.92 | 0.45 | A | C | PASSABLE |
| 4.0m × 12.0m | 1 : 3.00 | 0.51 | B | C | PASSABLE |
| 4.5m × 10.7m | 1 : 2.37 | 0.58 | B | B | GOOD |
| 5.0m × 9.6m | 1 : 1.92 | 0.64 | B | A | EXCELLENT |
| 6.0m × 8.0m | 1 : 1.33 | 0.77 | C | A | PASSABLE |
| 7.5m × 6.4m | 1 : 0.85 | 0.96 | D | A | FAIL |

FIG. 10

| ABSORBER AREA (m²) | L/W (m) | PERIMETER RATIO ᴛ (INVERSE RATIO TO L/W=1) | NOZZLE NUMBER RATIO β (RATIO TO L/W=1) | DESULFURIZATION PERFORMANCE PARAMETER (α×β) |
|---|---|---|---|---|
| 32 | 0.5 | 0.94 | 1.04 | 0.98 |
| 32 | 1.0 | 1.00 | 1.00 | 1.00 |
| 32 | 2.0 | 0.94 | 1.04 | 0.98 |
| 32 | 2.6 | 0.89 | 0.99 | 0.88 |
| 32 | 3.6 | 0.83 | 0.94 | 0.78 |
| 32 | 6.0 | 0.70 | 0.96 | 0.67 |
| 32 | 8.0 | 0.63 | 0.74 | 0.47 |

SHIP DESULFURIZATION DEVICE AND SHIP EQUIPPED WITH SHIP DESULFURIZATION DEVICE

TECHNICAL FIELD

The present disclosure relates to a ship desulfurization device and a ship equipped with the ship desulfurization device.

BACKGROUND ART

With the recent tightening of the exhaust gas regulations for ships, in the emission control area (ECA), it is required to use fuel oil containing 0.1% or less of sulfur, or to take an alternative measure that has an effect similar thereto. Furthermore, from 2020, also in a normal sea area, it is going to be required to use fuel oil containing 0.5% or less of sulfur, or to take an alternative measure that has an effect similar thereto. Typically, for super-large size ships such as an ultra large container ship (ULCS), a low-sulfur fuel oil containing a small amount of sulfur has been used to comply with such regulations. In future, a demand for provision of desulfurization devices is expected to increase also for these super-large size ships.

The amount of exhaust gas discharged from a main engine of a super-large size ship (exhaust gas amount at the time of 100% load) reaches as much as 200,000 $Nm^3/h$, or even more. Further, to meet various demands for electricity in the vessel, a super-large size ship is equipped with a plurality of generator engines and boilers. Thus, a desulfurization device to be mounted to a super-large size ship needs to have an absorber having a broad area for passage, to desulfurize a large volume of exhaust gas discharged from the main engine and the plurality of generator engines and boilers. However, if a typical desulfurization device for a main engine mounted to a relatively small ship such as a bulk carrier is diverted for a super-large size ship, a plurality of absorbers would be needed, which causes limitations and changes in terms of design such as reducing the load capacity and increasing the vessel-body dimensions.

Further, a typical desulfurization device for a relatively small main engine is equipped with a round (circular) absorber. One may consider increasing the size of this round absorber for a super-large size ship. However, a round absorber tends to involve dead space when placed in a ship, as compared to a rectangular absorber, and thus may deteriorate the layout efficiency in a ship.

Thus, to solve the above problems, as an absorber of a desulfurization device for a super-large size ship, a rectangular absorber may be provided, which is a proven absorber that has been used in onshore desulfurization devices for plant facilities, factories, and the like. For instance, Patent Document 1 discloses an example of cleaning device provided with a rectangular cleaning tank (absorber), which is a wet-type cleaning device for removing pollutants such as particulate matters, harmful gases, acidic compounds, and foul odor, from a production process, an industrial process, a commercial process, or the like.

CITATION LIST

Patent Literature

Patent Document 1: JP5631985B
Patent Document 2: JPH9-239233A

SUMMARY

Problems to be Solved

Meanwhile, most of the rectangular absorbers used in onshore desulfurization devices have a length L in the exhaust gas introducing direction in the interior space of the absorber and a length W in a direction orthogonal to the exhaust gas introducing direction, which satisfy a ratio (W:L) of from 1:0.2 to 1:1.0. In other words, in a planar view, the absorber has a rectangular shape with a lateral (shorter) direction along the exhaust gas introducing direction, and a longitudinal (longer) direction along a direction orthogonal to the exhaust gas introducing direction. This is because, if the shape has a longitudinal direction along the exhaust gas introducing direction, the gas flow velocity varies considerably between the front side (the side of exhaust gas introducing port) and the back side (opposite side to the exhaust gas introducing port) in the longitudinal direction, which makes it difficult to let exhaust gas flow uniformly through the absorber. If the flow of exhaust gas in the absorber becomes uneven, the desulfurization process in the absorber becomes also uneven, which may deteriorate the desulfurization performance.

To address the above problem, the cleaning device of the Patent Document 1 described above has an exhaust gas introducing port on an upper end portion of the absorber, and is configured to introduce exhaust gas introduced from the exhaust gas introducing port into a gas distribution chamber disposed on a lower part of the absorber via an exhaust gas duct extending vertically in the absorber, so as to let exhaust gas flow uniformly through the absorber.

However, diverting such an absorber as disclosed in Patent Document 1 to an absorber for a super-large size ship raises several problems in terms of layout limitations, as described below.

Firstly, while the absorber disclosed in Patent Document 1 has a substantially square shape in a planar view (W:L=1: 1), in a certain type of super-large size ship such as ULCS, an absorber having a longitudinal direction along the exhaust gas introducing direction in a planar view may have a higher arrangement performance.

Secondly, as described above, the cleaning tank disclosed in Patent Document 1 includes an exhaust gas duct extending vertically in the absorber, and a gas distribution chamber disposed on a lower part of the cleaning tank. Thus, the volume of the absorber is increased as much as the space required to provide the exhaust gas duct and the gas distribution chamber.

Thirdly, while the absorber for a ship is normally disposed protruding upward from the upper deck, the main engine, which is a main source that discharges exhaust gas, is disposed in an engine room in a lower section inside the hull. That is, the absorber is normally disposed above the main engine in the hull. Thus, with the absorber in Patent Document 1, it is necessary to guide exhaust gas discharged from the main engine not to the lateral end portion of the absorber but to the upper end portion via the lateral end portion, which leads to an increase in the length of the exhaust gas introducing line.

Further, Patent Document 2 discloses a desulfurization device having a rectangular absorber mounted to a ship (FIGS. 3 and 4). However, the absorber of Patent Document 2 is mounted to a barge towed by a tanker (main ship), not to the main ship itself, and there is no disclosure of the problem related to layout limitations in arranging a desulfurization device on a ship (main ship), or solution thereto.

The present invention was made under the above described background art, and the object thereof is to provide a ship desulfurization device which has a high arrangement performance in a ship such as a super-large size ship.

Solution to the Problems (1) A ship desulfurization device for desulfurizing exhaust gas discharged from an exhaust gas generation device mounted to a ship, according to at least one embodiment of the present invention, includes: an absorber including an absorber body unit defining an interior space having a longitudinal direction and having an exhaust gas introducing port formed on an end portion of the absorber body unit with respect to the longitudinal direction, the exhaust gas introducing port being in communication with the interior space; and an exhaust gas introducing device for introducing exhaust gas discharged from the exhaust gas generation device to the absorber body unit. When L is a maximum length of the interior space of the absorber body unit with respect to the longitudinal direction, and W is a maximum width of the interior space of the absorber body unit with respect to a lateral direction that is orthogonal to the longitudinal direction, a ratio (W:L) of the maximum width W to the maximum length L is within a range of 1:X, where $1.1 < X \le 6.0$.

The ship desulfurization device according to the above embodiment (1) includes an absorber including an absorber body unit defining an interior space having a longitudinal direction and having an exhaust gas introducing port formed on an end portion of the absorber body unit with respect to the longitudinal direction, the exhaust gas introducing port being in communication with the interior space. That is, the interior space of the absorber body unit is formed to have a longitudinal direction along the exhaust gas introducing direction. Thus, dead space is less likely to be formed as compared to a typical round (circular) absorber, and thus the arrangement performance is high when being provided for the ship. Further, it is possible to provide a ship desulfurization device with a high arrangement performance, for a ship being a super-large size container ship or the like such as ULCS (ships for which an absorber having a planar shape with a longitudinal direction along the exhaust gas introducing direction has a higher arrangement performance). Furthermore, compared to a case in which the interior space of the absorber body unit has a longitudinal direction along a direction orthogonal to the exhaust gas introducing direction, it is possible to reduce the risk of exhaust gas being discharged outside of the absorber without being desulfurized.

Further, according to the above embodiment (1), the ratio (W:L) of the maximum width W to the maximum length L of the interior space is within the range of 1:X, where $1.1 < X \le 6.0$. Accordingly, by setting the lower limit of 1:6.0 for the ratio (W:L) of the maximum width W to the maximum length L of the interior space, it is possible to keep the unevenness of the exhaust gas flow in the absorber within the practical allowable range according to the study of the present inventors.

(2) In some embodiments, in the above ship desulfurization device (1), the ratio (W:L) of the maximum width W to the maximum length L is within a range of 1:X, where $1.5 < X \le 2.0$.

According to the study of the present inventors, the lower limit of the ratio (W:L) of the maximum width W to the length L for maintaining the uniformity of the exhaust gas flow in the absorber in a preferable state is 1:2.0. On the other hand, taking account of the arrangement performance of the desulfurization device in a ship, the ratio (W:L) of the maximum width W to the length L should be decreased to some extent, and thus the limit of the ratio (W:L) of the maximum width W to the length L is preferably 1:1.5. Thus, according to the embodiment (2), it is possible to provide a ship desulfurization device with a good balance, which excels in both of the arrangement performance and the desulfurization performance.

(3) In some embodiments, in the above ship desulfurization device (1) or (2), the absorber is mounted to the ship so that the longitudinal direction of the interior space of the absorber body unit is along a width direction of the ship.

In a super-large size ship of a kind such as ULCS, the absorber may have a higher arrangement performance when having the longitudinal direction in the starboard-port direction (width direction) orthogonal to the fore-aft direction of the ship, than when having the longitudinal direction in the fore-aft direction. For instance, in some cases of the above described ULCS, the hull is divided into a plurality of regions in the fore-aft direction of the ship, whose basic unit is a length capable of accommodating a 40-feet container along the longitudinal direction of the container, and the absorber needs to be placed in one of the regions. Thus, according to the above embodiment (3), it is possible to improve the arrangement performance in the case of such a ship.

Furthermore, according to the above embodiment (3), it is possible to configure the absorber body unit so as to have the longitudinal direction along the width direction of the ship, and thus it is possible to reduce bending stress applied to the absorber at the time of rolling of the ship, as compared to an absorber having the longitudinal direction along the fore-aft direction of the ship. Thus, it is possible to enhance the resistance of the absorber against rolling.

(4) In some embodiments, in the above ship desulfurization device (3), the ship includes a funnel for releasing exhaust gas discharged from the exhaust gas generation device to outside, the funnel having a cylindrical shape with a longitudinal direction along the width direction of the ship. Further, the absorber is disposed inside the funnel.

According to the above embodiment (4), with the absorber positioned inside the funnel having an elongated tubular shape having the longitudinal direction along the width direction of the ship, it is possible to minimize the influence on the arrangement plan of various facilities to be mounted to the ship other than the absorber. Thus, an existing ship can be easily retrofitted. Further, with the absorber disposed inside the funnel, it is possible to improve the installation workability and maintainability, compared to a case in which the absorber is disposed inside the ship, like inside the engine room.

(5) In some embodiments, in the above ship desulfurization device (4), an waste heat recovery device is disposed inside the funnel, for recovering thermal energy from exhaust gas discharged from the exhaust gas generation device. Further, the absorber is disposed next to the waste heat recovery device in the width direction of the ship.

According to the above embodiment (5), with the absorber and the waste heat recovery device being arranged next to each other along the width direction of the ship inside the funnel, it is possible to simplify the configuration of the exhaust gas introducing device, compared to a case in which the waste heat recovery device and the absorber are disposed away from each other.

(6) In some embodiments, in the above ship desulfurization device (5), the absorber further includes an exhaust gas introducing unit having a first end portion connected to the exhaust gas introducing port of the absorber body unit, the exhaust gas introducing unit extending upward from the first end portion toward a second end portion.

According to the above embodiment (6), the absorber further includes an exhaust gas introducing unit extending upward from the exhaust gas introducing port of the absorber body unit. Accordingly, by connecting the exhaust gas introducing line to the second end portion of the exhaust gas introducing unit, it is possible to introduce exhaust gas into the absorber disposed in a small space inside the funnel.

(7) In some embodiments, in the above ship desulfurization device (6), the exhaust gas generation device includes a main engine and an auxiliary engine, and the exhaust gas introducing device includes: an exhaust gas introducing pipe extending along the width direction of the ship from the waste heat recovery device toward the second end of the exhaust gas introducing unit; and an auxiliary exhaust gas introducing pipe connected to the exhaust gas introducing pipe, for introducing exhaust gas discharged from the auxiliary engine into the absorber body unit via the exhaust gas introducing pipe.

According to the above embodiment (7), it is possible to introduce exhaust gas discharged from the main engine and the auxiliary engine into the absorber disposed in a small space inside the funnel.

(8) In some embodiments, in the above ship desulfurization device according to any one of the above (1) to (7), the absorber body unit includes: a pair of longitudinal wall surfaces extending in parallel to each other along the longitudinal direction of the interior space; and a pair of lateral wall surfaces extending in parallel to each other along the lateral direction of the interior space.

According to the above embodiment (8), the planar shape of the interior space of the absorber body unit is formed into a rectangular shape defined by the pair of longitudinal wall surfaces and the pair of lateral wall surfaces. When the interior space of the absorber body unit has such a rectangular shape, dead space is less likely to be formed in the ship, and thus the arrangement efficiency upon arrangement in a ship is improved.

(9) In some embodiments, in the above ship desulfurization device (8), the absorber body unit includes a storage space formed therein, the storage space storing a cleaning liquid after being sprayed over the exhaust gas introduced into the interior space, and the absorber body unit includes a traverse member which connects the pair of longitudinal wall surfaces and which traverses the storage space along the lateral direction of the interior space.

According to the above embodiment (9), when sloshing occurs due to rolling of the ship or the like, which is heavy surge on the surface of the cleaning liquid stored in the storage space, for instance, it is possible to suppress the surge of the liquid surface with the traverse member. Further, with the traverse member connecting the pair of longitudinal wall surfaces, it is possible to improve the strength of the absorber body unit having the interior space with a rectangular shape.

(10) In some embodiments, in the above ship desulfurization device (9), the traverse member includes a traverse beam member having an elongated shape.

According to the above embodiment (10), with the traverse beam member having an elongated shape, it is possible to achieve the above described effects to reinforce the absorber body unit and suppress sloshing.

(11) In some embodiments, in the above ship desulfurization device (9), the traverse member includes a sheeting member having a flat plate shape.

According to the above embodiment (11), with the sheeting member having a flat plate shape, it is possible to achieve the above described effects to reinforce the absorber body unit and suppress sloshing.

(12) In some embodiments, the ship desulfurization device according to any one of the above (8) to (11) further includes a spraying device for spraying a cleaning liquid over the exhaust gas introduced into the interior space of the absorber body unit. The spraying device includes: a longitudinal spray pipe extending parallel to each of the pair of longitudinal wall surfaces in the interior space of the absorber body unit; and a plurality of spray nozzles disposed on the longitudinal spray pipe.

According to the above embodiment (12), it is possible to provide a constant distance between the longitudinal wall surfaces and each of the plurality of spray nozzles disposed on the longitudinal spray pipe. Accordingly, it is possible to spray the cleaning liquid uniformly in the interior space, and thus it is possible to suppress the negative effect of uneven spraying of the cleaning liquid due to swaying (rolling, pitching, yawing) of the ship.

(13) In some embodiments, the ship desulfurization device according to any one of the above (8) to (11) further includes a spraying device for spraying a cleaning liquid over the exhaust gas introduced into the interior space of the absorber body unit. The spraying device includes: a plurality of lateral spray pipes extending parallel to each of the pair of lateral wall surfaces in the interior space of the absorber body unit, the lateral spray pipes arranged at regular intervals; and at least one spray nozzle disposed on each of the plurality of lateral spray pipes.

According to the above embodiment (13), it is possible to set an equal spraying area for the spray nozzles disposed on each of the plurality of lateral spray pipes. Accordingly, it is possible to spray the cleaning liquid uniformly in the interior space, and thus it is possible to suppress the negative effect of uneven spraying of the cleaning liquid due to swaying (rolling, pitching, yawing) of the ship.

(14) In some embodiments, in the above ship desulfurization device according to any one of the above (1) to (13), the exhaust gas generation device includes a main engine, and an exhaust gas amount of the main engine is at least 200,000 $Nm^3/h$.

The ship desulfurization device according to the above (1) to (13) can be suitably used as a desulfurization device for a super-large size ship whose main engine discharges an exhaust gas amount of 200,000 $Nm^3/h$ or higher, for instance. While the upper limit of the exhaust gas amount of a main engine is not particularly limited, it is practically not higher than 500,000 $Nm^3/h$.

(15) In some embodiments, in the ship desulfurization device according to any one of the above (1) to (14), the ship is a container ship having a container load capacity of at least 10,000 TEU.

The ship desulfurization device according to the above (1) to (14) can be suitably used as a desulfurization device for a ultra large container ship (ULCS) having a container capacity load of 10,000 TEU or higher. While the upper limit of the container capacity load is not particularly limited, it is practically not higher than 20,000 TEU.

(16) A ship according to at least one embodiment of the present invention includes the ship desulfurization device according to any one of the above (1) to (15).

Advantageous Effects

According to at least one embodiment of the present invention, it is possible to provide a ship desulfurization device having a high arrangement performance, for a ship being a super-large size container ship or the like as described above.

BRIEF DESCRIPTION OF DRAWINGS

FIGS. 6A to 6C are each a diagram showing a result of a study on the planar shape of the interior space of the absorber body unit in a ship desulfurization device according to an embodiment of the present invention.

FIG. 10 is a diagram showing a result of a study on the relationship between a desulfurization performance parameter and the shape (aspect ratio) of the interior space of the absorber body unit in a ship desulfurization device according to an embodiment of the present invention.

DETAILED DESCRIPTION

Figure 1:
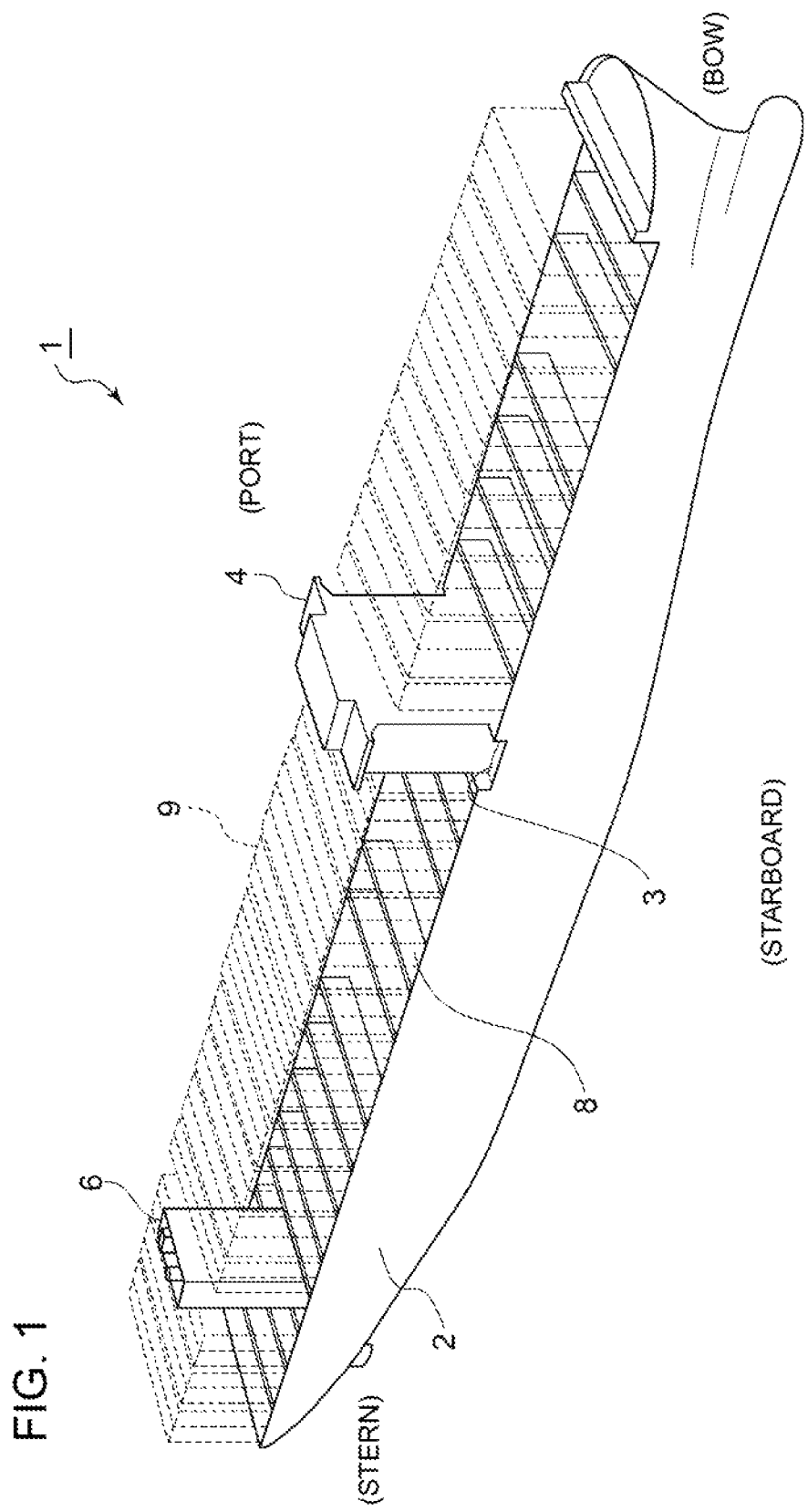
FIG. 1 is a perspective view of a ship according to an embodiment of the present invention.

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

FIG. 1 is a perspective view of a ship according to an embodiment of the present invention. The ship 1 according to an embodiment of the present invention is a super-large size ship which includes a main engine whose exhaust gas amount (exhaust gas amount at the time of 100% load) exceeds 200,000 $Nm^3/h$. In the depicted embodiment, the ship 1 is a super-large size container ship having a container load capacity of at least 10,000 TEU, known as an ultra large container ship (ULCS).

As shown in FIG. 1, the ship 1 includes a hull 2, an accommodation house 4 protruding from an upper deck 3 at a position slightly closer to the front from the center with respect to the fore-aft direction, and a funnel 6 protruding from the upper deck 3 at a position closer to the stem from the accommodation house 4. Further, in the bulk of the hull 2, a plurality of bulkheads 8 are provided at intervals from one another, extending in the starboard-port direction orthogonal to the fore-aft direction. Accordingly, in the fore-aft direction, the hull 2 is divided into a plurality of regions, whose basic unit is a length capable of accommodating a 40-feet container 9 along the longitudinal direction of the container.

Figure 2A:
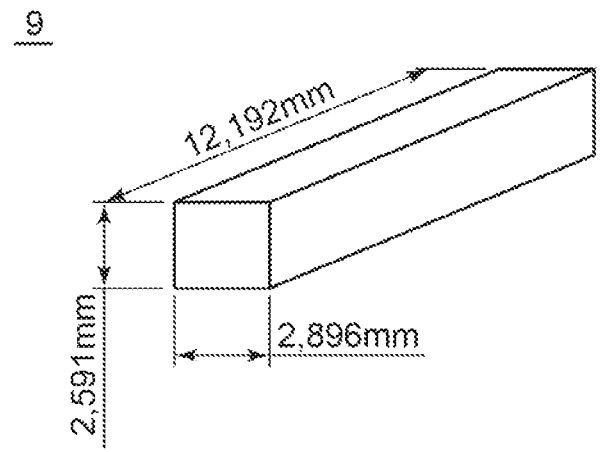
FIG. 2A is a diagram showing dimensions of a 40-feet container.
Figure 2B:
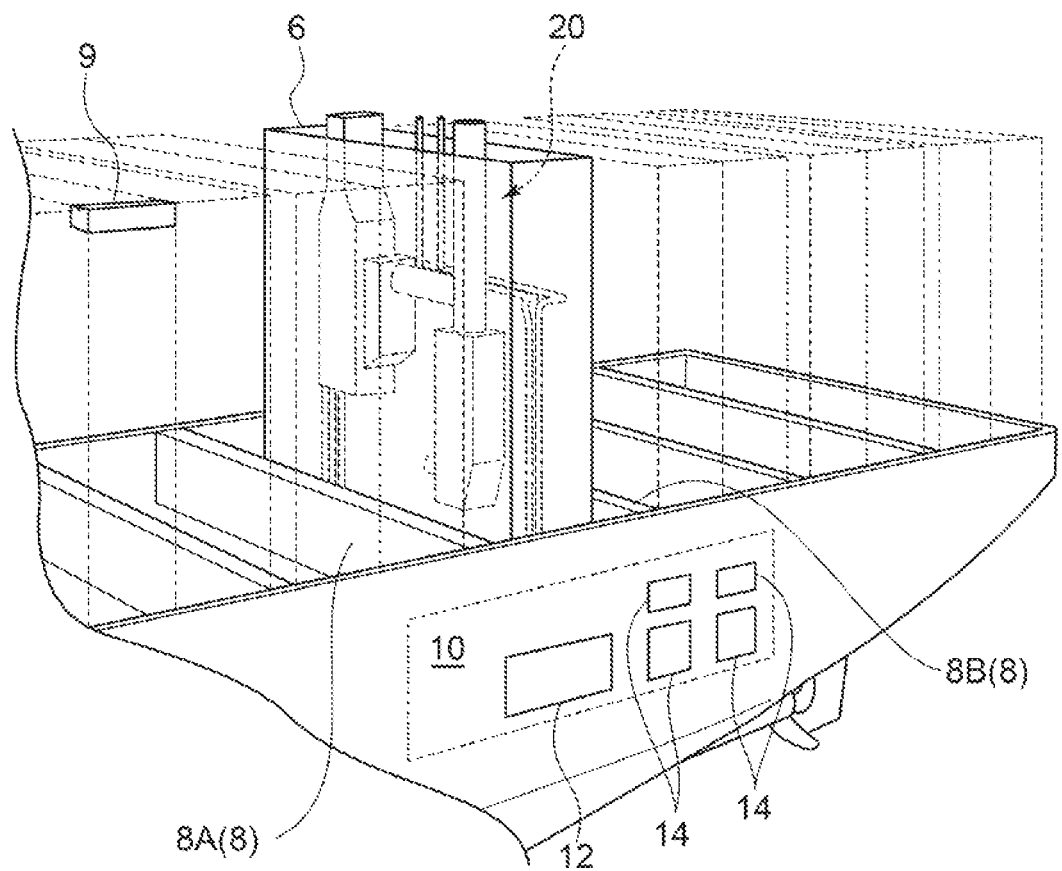
FIG. 2B is an enlarged view of a funnel and its surroundings in the ship shown in FIG. 1.

FIG. 2A shows the dimensions of the 40-feet container 9. FIG. 2B is an enlarged view of a funnel and its surroundings in the ship shown in FIG. 2B. As shown in FIG. 2B, the funnel 6 is disposed between a pair of adjacent bulkheads 8A, 8B. An engine room 10 is formed inside the hull 2, directly below the funnel 6. A main engine 12 and a plurality of auxiliary engines 14 are disposed in the engine room 10. The main engine 12 includes a marine diesel engine for applying a propelling force to the ship 1, or a main engine boiler for driving a main engine turbine. The auxiliary engines 14 include auxiliary boilers and auxiliary engines for meeting various heat demands in the ship 1. The main engine 12 and the auxiliary engines 14 correspond to an exhaust gas generation device mounted to the ship 1 according to an embodiment of the present invention.

The funnel 6 is a structure for releasing exhaust gas discharged from the main engine 12 and the auxiliary engines 14 to outside of the ship 1, and is formed to have an elongated tubular shape having a longitudinal direction along the starboard-port direction (width direction) of the ship 1. Further, inside the funnel 6, a ship desulfurization device 20 is disposed, for desulfurizing exhaust gas discharged from the main engine 12 and the auxiliary engines 14 mounted to the ship 1. In some embodiments, the inner width of the funnel 6 (length in a direction orthogonal to the longitudinal direction) is within a range from about 3 m to 8 m. On the other hand, the length in the longitudinal direction of the funnel 6 has relatively fewer limitations, and may be set within a range from 5 m to 20 m, for instance.

Figure 3:
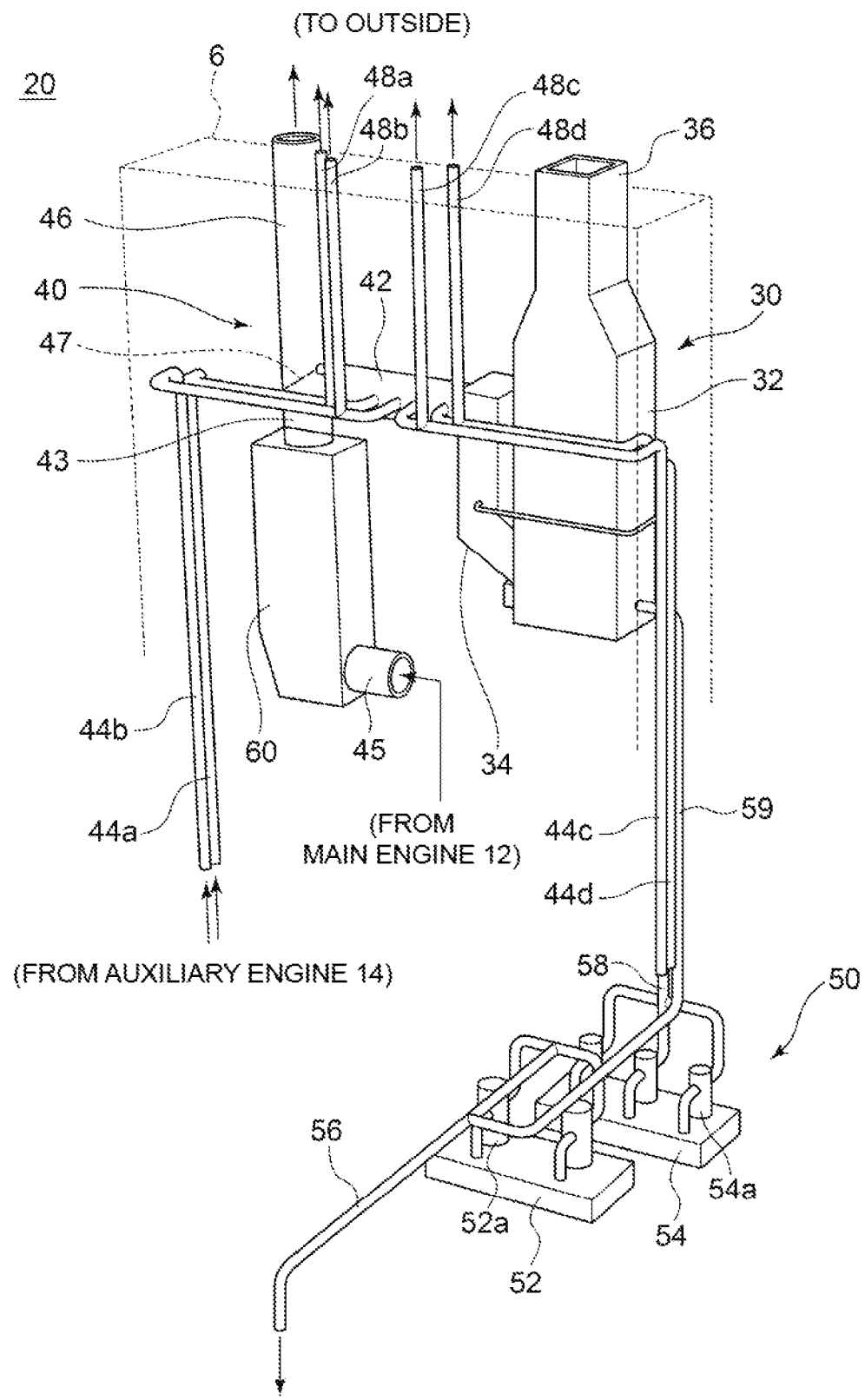
FIG. 3 is a perspective view of a ship desulfurization device according to an embodiment of the present invention.

FIG. 3 is a perspective view of a ship desulfurization device according to an embodiment of the present invention.

Figure 4:
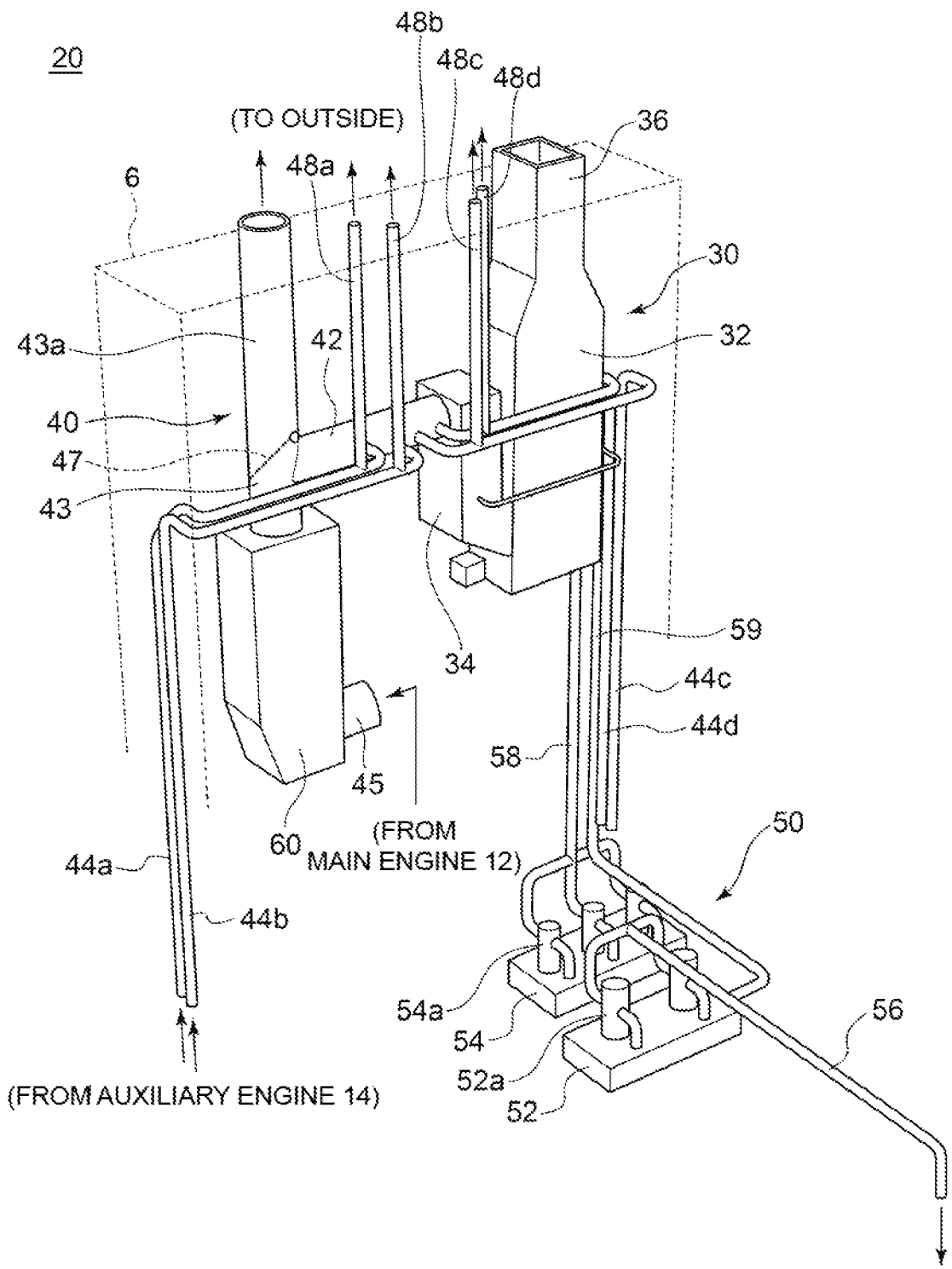
FIG. 4 is a perspective view of a ship desulfurization device according to an embodiment of the present invention, as seen in a different direction from FIG. 3.

FIG. 4 is a perspective view of a ship desulfurization device according to an embodiment of the present invention, as seen in a different direction from FIG. 3.

As shown in FIGS. 3 and 4, the ship desulfurization device 20 according to an embodiment of the present invention includes an absorber 30 including an absorber body unit 32, and an exhaust gas introducing device 40 for guiding exhaust gas discharged from the main engine 12 and the auxiliary engines 14 to the absorber body unit 32.

Figure 5:
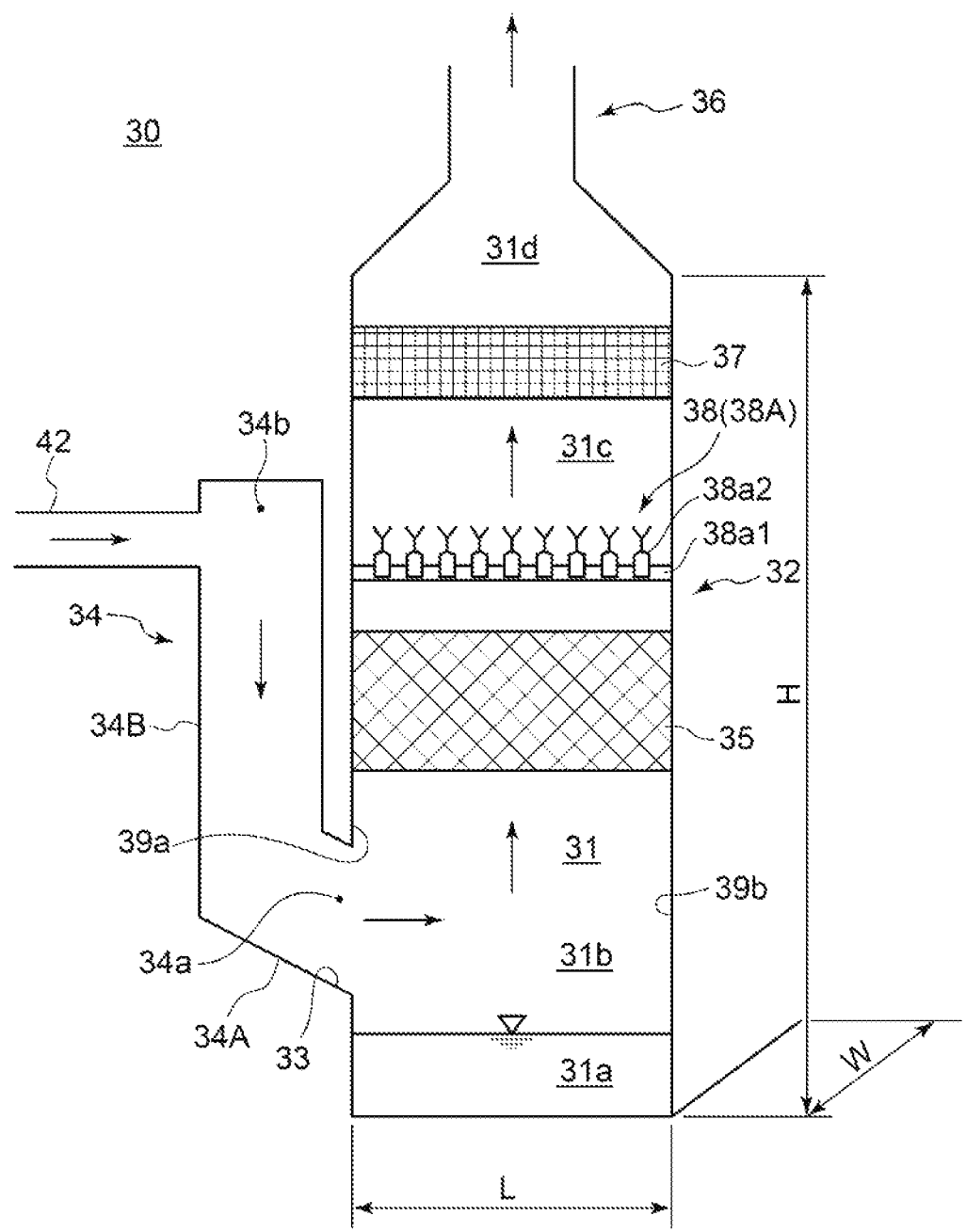
FIG. 5 is a schematic diagram of an absorber of a ship desulfurization device according to an embodiment of the present invention.

FIG. 5 is a schematic diagram of an absorber of a ship desulfurization device according to an embodiment of the present invention. As shown in FIG. 5, the absorber 30 includes an absorber body unit 32, an exhaust gas introducing unit 34, and an exhaust gas discharge unit 36. The absorber body unit 32 defines an interior space 31 having a longitudinal direction therein. Furthermore, on a lateral end portion 39a on a first side, with respect to the longitudinal direction, of the absorber body unit 32, an exhaust gas introducing port 33 is formed and is in communication with the interior space 31 (lower interior space 31b). Exhaust gas introduced into the interior space 31 through the exhaust gas introducing port 33 flows through the lower interior space 31b from the lateral end portion 39a on the first side toward the lateral end portion 39b on the second side, and continues flowing upward through the interior space 31.

In the depicted embodiment, in the interior space 31, a packed layer 35 separating the lower interior space 31b and the upper interior space 31c is formed, in a position above the lower interior space 31b. The packed layer 35 includes a plurality of regular packings laminated into several layers. Further, above the packed layer 35, a spraying device 38 is disposed, for spraying a cleaning liquid (e.g. sea water or pure water) into the interior space. Further, the spraying device 38 is configured to remove sulfur from exhaust gas by spraying the cleaning liquid over exhaust gas passing through the packed layer 35 and causing gas-liquid contact between exhaust gas and the cleaning liquid.

Further, in the interior space 31, a mist eliminator 37 separating the upper interior space 31c and the outlet-side interior space 31d is disposed, in a position above the upper interior space 31c. The mist eliminator 37 is configured to remove moisture from exhaust gas passing through the mist eliminator 37. Further, exhaust gas having passed through the mist eliminator 37 is discharged outside the ship 1 from the exhaust gas discharge unit 36 connected to the top section of the absorber body unit 32, via the outlet-side interior space 31d.

Further, a storage space 31a storing a cleaning liquid after being sprayed over exhaust gas introduced into the interior space 31 is formed in the absorber body unit 32. In the depicted embodiment, the storage space 31a is formed on a position below the lower interior space 31b, and below the lower surface of the exhaust gas introducing port 33.

Further, as shown in FIGS. 3 and 4, the ship desulfurization device 20 further includes a sea-water supplying device 50 for suppling sea water to the above described spraying device 38. The sea-water supplying device 50 includes a discharged water dilution pump 52a, a sea-water supply pump 54a, a discharge water pipe 56, a sea-water supply pipe 58, and a sea-water discharge pipe 59. Further, the sea-water supplying device 50 is configured to supply sea water introduced into the hull 2 with the sea-water supply pump 54a to the spraying device 38 via the sea-water supply pipe 58. Further, the sea-water supplying device 50 is configured to dilute scrubber discharge water discharged from the absorber 30 with the dilution pump 52a, and discharge the water outside the ship 1 via the discharge water pipe 56. Further, in the depicted embodiment, each of a plurality of discharged water dilution pumps 52a is connected to the same No. 1 sea chest 52. Similarly, each of a plurality of sea-water supply pumps 54a is connected to the same No. 2 sea chest 54.

As described above, the interior space 31 of the absorber body unit 32 is formed to have a planar shape that has a longitudinal direction along the exhaust gas introducing direction. The planar shape of the interior space 31 of the absorber body unit 32 will now be described in detail with reference to FIGS. 6A to 6C. Further, in FIGS. 6A to 6C, reference sign L indicates the length of the interior space 31 (length in the longitudinal direction) and reference sign W indicates the width of the interior space 31 (length in a direction orthogonal to the longitudinal direction). Further, reference sign D indicates the equivalent diameter, which is a diameter of a circular cross-section that has the same cross-sectional area as that of a rectangular having the length L and the width W.

Further, in the embodiment shown in FIGS. 6A to 6C, the planar shape of the interior space 31 of the absorber body unit 32 has a rectangular shape defined by a pair of longitudinal wall surfaces extending parallel to each other and a pair of lateral wall surfaces extending parallel to each other. Nevertheless, the planar shape of the interior space 31 is not limited to a rectangular shape, and may be a quadrilateral shape, an oval shape, or an ellipse shape having a longitudinal direction, as long as the effect of the present invention can be achieved.

FIGS. 6A to 6C are each a diagram showing a result of a study on the planar shape of the interior space of the absorber body unit in a ship desulfurization device according to an embodiment of the present invention. In the tables shown in FIGS. 6A to 6C, each planar shape is evaluated according to two items: "arrangement performance" refers to how easily the absorber 30 can be arranged in the ship 1 in terms of layout, and "desulfurization performance" refers to how uniform the exhaust gas flows through the interior space 31 in the absorber 30.

The "arrangement performance" was evaluated on the basis of the following evaluation criteria, in four stages of A, B, C, and D, which represent the arrangement performance in the descending order. This evaluation is based on the idea that, when the absorber 30 is to be placed in an area having an elongated shape such as the inside of the funnel 6, the smaller maximum width W in the lateral direction relative to the equivalent diameter D, the higher the arrangement performance.

Figure 9:
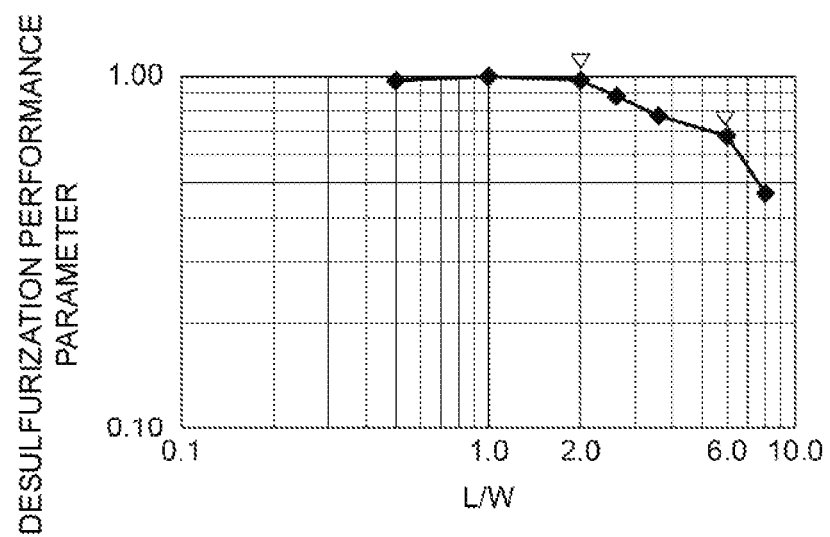
FIG. 9 is a graph showing a relationship between a desulfurization performance parameter and the shape (aspect ratio) of the interior space of the absorber body unit in a ship desulfurization device according to an embodiment of the present invention.
Figure 11:
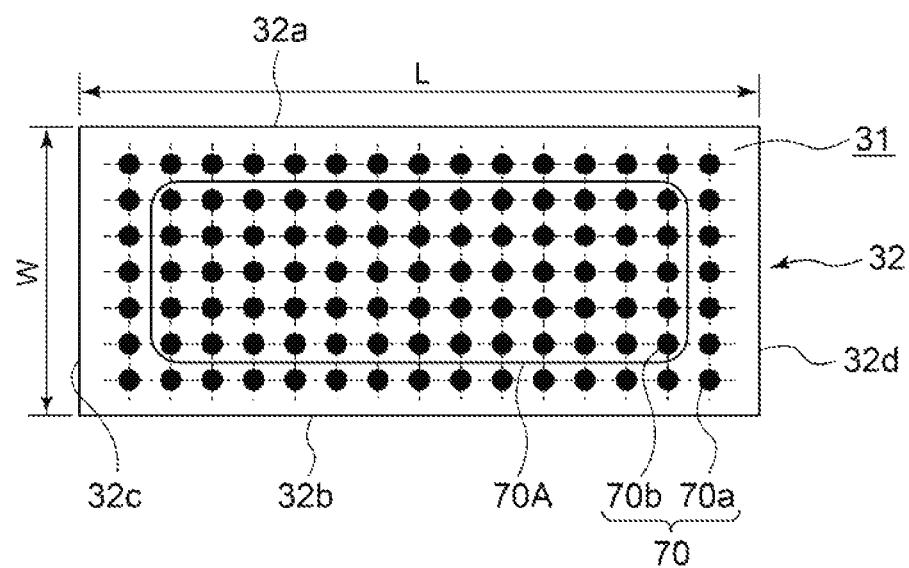
FIG. 11 is a planar view for describing the arrangement condition of a spray nozzle in the interior space of the absorber body unit.

(Evaluation Criteria)
A: $(W/D)<0.50$
B: $0.50 \leq (W/D)<0.75$
C: $0.75 \leq (W/D)<0.90$
D: $0.90 \leq (W/D)$ FIG. 9 is a graph showing a relationship between a desulfurization performance parameter and the shape (aspect ratio L/W) of the interior space of the absorber in a ship desulfurization device according to an embodiment of the present invention. The data is expressed in double logarithm in order to make its change stand out. FIG. 10 is a diagram showing a result of a study on the relationship between a desulfurization performance parameter and the shape (aspect ratio) of the interior space of the absorber body unit in a ship desulfurization device according to an embodiment of the present invention. FIG. 11 is a planar view for describing the arrangement condition of a spray nozzle in the interior space of the absorber body unit.

The relationship between the desulfurization performance and the shape of the interior space 31 of the absorber body unit 32 was studied by using the desulfurization performance parameter defined below.

Desulfurization performance parameter=perimeter ratio α×interference nozzle number ratio β

α: inverse ratio of perimeter to the standard condition (L/W=1)=perimeter under standard condition/perimeter under aspect ratio to be studied β: ratio of the number of interference nozzles to the standard condition=the number of interference nozzles under the aspect ratio to be studied/the number of interference nozzles under standard condition The perimeter is the outer perimeter length in a horizontal cross section of the absorber body unit 32. If the cleaning liquid adheres to the wall surface, it generates loss that does not contribute to desulfurization. Thus, when the cross section is the same, a longer perimeter is an obstructive factor that deteriorates the desulfurization performance. Since the perimeter is an obstructive factor, the perimeter ratio α is defined by an inverse ratio to the standard condition (L/W=1).

An interference nozzle refers to a spray nozzle which is surrounded by other spray nozzles on four sides. That is, as shown in FIG. 11, in a case where a plurality of rows of spray nozzles 70 are disposed along the longitudinal direction and the width direction in the interior space 31 of the absorber body unit 32, such that a plurality of spray nozzles 70 are arranged in a grid pattern as a whole, the spray nozzles 70b disposed inside the range 70A excluding the spray nozzles 70a disposed on the outermost side are the above described interference nozzles.

If the cross-sectional area is the same and the number of interference nozzles increases, injected desulfurization liquid interferes (overlaps) in a larger area between adjacent spray nozzles, and thus a larger number of interference nozzles is a promotional factor that improves the desulfurization performance. Since the number of interference nozzles is a promotional factor, the interference nozzle number ratio is defined by the ratio to the standard condition (L/W=1). Further, the nozzle number was calculated assuming that the nozzles are arranged in a grid pattern using a predetermined nozzle pitch (in the present embodiment, 0.5 m), and a decimal was rounded to an integer.

As shown in FIG. 9, under the condition that the cross-sectional area is the same, as the aspect ratio L/W becomes greater than one, the perimeter increases, and the number of interference nozzles decreases. Thus, the desulfurization performance parameter decreases. From FIG. 9, the desulfurization performance parameter is substantially constant when L/W is 2.0 or below, decreases in the range from 2.0 to 6.0, and decreases considerably when L/W is 6.0 or higher. Thus, it was determined that there are two inflection points at L/W 2.0 and 6.0.

The "desulfurization performance" was evaluated on the basis of the following evaluation criteria, in four stages of A, B, C, and D, which represents the desulfurization performance in the descending order. This is based on the idea that, the more uniform the exhaust gas flows through the absorber 30, the higher the desulfurization performance. Further, the uniformity of the exhaust gas flow inside the absorber 30 was evaluated from the above study results on the basis of the following study conditions. As shown in FIG. 9, when the aspect ratio is two or lower, it is possible to maintain the desulfurization performance parameter at a substantially constant high level, and it is possible to maintain the uniformity of the exhaust gas flow in the absorber 30 in a preferable state. Further, when the aspect ratio is greater than two and not greater than three, the desulfurization performance gradually decreases with an increase in the aspect ratio, but the desulfrization performance parameter can be maintained at a high level. Further, also when the aspect ratio is greater than three and not greater than six, the desulfurization performance gradually decreases with an increase in the aspect ratio, but still the desulfurization performance parameter can be maintained at a relatively high level. On the other hand, as shown in FIG. 9, when the aspect ratio exceeds six, the desulfurization parameter decreases rapidly, and the uniformity of the exhaust gas in the absorber 30 can be considered to get out of the allowable range for exerting the required desulfurization performance. Accordingly, the aspect ratio was set to have an upper limit of six.

(Evaluation Criteria)
A: W:L=1:X, where $1.1<X\leq2.0$
B: W:L=1:X, where $2.0<X\leq3.0$
C: W:L=1:X, where $3.0<X\leq6.0$
D: W:L=1:X, where $6.0<X$ (Study Condition)
Inlet gas flow velocity=2 to 20 m/s
Absorber interior flow velocity=1 to 5 m/s
Spray amount=30 to 20 $m^3/m^2 \cdot h$ Further, on the basis of the evaluation results on the two items of "arrangement performance" and "desulfurization performance", "comprehensive evaluation" was performed. The "comprehensive evaluation" was evaluated on the basis of the following evaluation criteria, in three stages of "Excellent", "Good", and "Passable", in the descending order of the comprehensive evaluation.

Excellent: at least one A, with no C or D
Good: two Bs
Pass: at least one C, with no D
Fail: one or more D As shown in FIGS. 6A to 6C, the planar shape of the interior space 31 where W:L is 1:X, where $1.1<X\leq2.0$ was evaluated as "excellent" in the comprehensive evaluation. While "arrangement performance" and "desulfurization performance" have a trade-off relationship, by setting W:L in the above range, it is possible to provide a ship desulfuization device 20 with a good balance, which excels in both of the arrangement performance and the desulfurization performance.

Next, the planar shape of the interior space 31 where W:L is 1:X, where $2.0<X\leq3.0$ was evaluated as "good" in the comprehensive evaluation. Next, the planar shape of the interior space 31 where W:L is 1:X, where $3.0<X\leq6.0$ was evaluated as "Passable" in the comprehensive evaluation.

Further, the planar shape of the interior space 31 where W:L is 1:X, where $X\leq1.1$ was evaluated as "fail", for the "arrangement performance" is low, although the "desulfurization performance" is high. Furthermore, as described above, the planar shape of the interior space 31 where W:L is 1:X, where $X>6.0$ was evaluated as "fail", for the uniformity of the exhaust gas flow in the absorber 30 cannot be ensured, and the "desulfurization performance" is low.

Accordingly, the ship desulfurization device 20 according to an embodiment of the present invention described above includes the absorber 30 including the absorber body unit 32 defining the interior space 31 having the longitudinal direction and having the exhaust gas introducing port 33 formed on the lateral end portion 39a on the first side in the longitudinal direction so as to be in communication with the interior space 31 (lower interior space 31b). That is, the interior space 31 of the absorber body unit 32 is formed to have a longitudinal direction along the exhaust gas introducing direction. Thus, dead space is less likely to be formed as compared to a typical round (circular) absorber, and thus the arrangement performance is high when being provided for the ship 1. Further, with the absorber 30 having a planar shape with a longitudinal direction along the exhaust gas introducing direction, it is possible to improve the arrangement performance of the ship desulfurization device 20, for the ship 1 being a super-large size container ship or the like as described above. Furthermore, compared to a case in which the interior space of the absorber body unit has a longitudinal direction along a direction orthogonal to the exhaust gas introducing direction, it is possible to reduce the risk of exhaust gas being discharged outside of the absorber without being desulfurized.

Further, according to the ship desulfurization device 20 according to an embodiment of the present invention, the ratio (W:L) of the maximum width W to the maximum length L of the interior space 31 is within the range of 1:X where 1.1<X≤6.0. Accordingly, by setting the lower limit of 1:6.0 for the ratio (W:L) of the maximum width W to the maximum length L of the interior space 31, it is possible to keep the unevenness of the exhaust gas flow in the absorber 30 within the practically allowable range according to the study of the present inventors.

In some embodiments, as shown in FIGS. 6A to 6C described above, in the ship desulfurization device 20, the ratio (W:L) of the maximum width W to the maximum length L of the interior space 31 is within the range of 1:X, where 1.5<X≤2.0.

According to this embodiment, as described above, it is possible to provide a ship desulfurization device with a good balance, which excels in the arrangement performance, and the desulfurization performance in particular.

In some embodiments, as shown in FIGS. 1 to 4 for instance, the absorber 30 is mounted to the ship 1 so that the longitudinal direction of the interior space 31 of the absorber body unit 32 is along the width direction of the ship 1.

According to this embodiment, with the absorber 30 having the longitudinal direction along the width direction of the ship 1, it is possible to improve the arrangement performance of the ship desulfurization device 20, for the ship 1 being a super-large size container ship or the like as described above.

Further, according to this embodiment, it is possible to configure the absorber body unit 32 so as to have the longitudinal direction along the width direction of the ship 1, and thus it is possible to reduce bending stress applied to the absorber at the time of rolling of the ship 1, as compared to an absorber having the longitudinal direction along the fore-aft direction of the ship 1. Thus, it is possible to enhance the resistance of the absorber 30 against rolling.

In some embodiments, as shown in FIGS. 1 to 4 described above for instance, the ship 1 includes the funnel 6 for releasing exhaust gas discharged from the exhaust gas generation device (the main engine 12 and the auxiliary engines 14) to outside of the ship 1, formed to have an elongated tubular shape having a longitudinal direction along the width direction of the ship 1. Further, the absorber 30 is disposed inside the funnel 6.

In the depicted embodiment, the planar shape of the funnel 6 is formed into a rectangular shape. Further, in some embodiments, the planar shape of the funnel 6 is formed into a quadrilateral shape, an oval shape, an ellipse shape, or the like, having a longitudinal direction.

According to this embodiment, with the absorber 30 positioned inside the funnel 6 having an elongated tubular shape having the longitudinal direction along the width direction of the ship 1, it is possible to minimize the influence on the arrangement plan of various facilities to be mounted to the ship 1 other than the absorber 30. Thus, an existing ship 1 can be easily retrofitted. Further, with the absorber 30 disposed inside the funnel 6, it is possible to improve the installation workability and maintainability, compared to a case in which the absorber 30 is disposed inside the ship 1, like inside the engine room 10.

In some embodiments, as shown in FIGS. 3 and 4, inside the funnel 6 described above, an waste heat recovery device 60 for recovering thermal energy from exhaust gas discharged from the exhaust gas generation device (main engine 12) is disposed. Further, the absorber 30 is disposed next to the waste heat recovery device 60 in the width direction of the waste heat recovery device 60.

In the depicted embodiment, the waste heat recovery device 60 includes an exhaust gas economizer configured to generate steam from thermal energy recovered from exhaust gas. An exhaust gas inlet pipe 45 through which exhaust gas discharged from the main engine 12 is connected to a lower part of the waste heat recovery device 60, and an exhaust gas discharge pipe 43 is connected to an upper part of the waste heat recovery device 60. Further, from the exhaust gas discharge pipe 43, the exhaust gas introducing pipe 42 described below branches. Accordingly, exhaust gas is introduced into the absorber 30. The above exhaust gas inlet pipe 45, the exhaust gas discharge pipe 43, the exhaust gas introducing pipe 42 form a part of the exhaust gas introducing device 40 described above for introducing exhaust gas discharged from the main engine 12 and the auxiliary engines 14 to the absorber body unit 32.

Further, in the depicted embodiment, similarly to the absorber body unit 32, the waste heat recovery device 60 is formed to have a longitudinal direction along the width direction of the ship 1. Further, the interior space of the waste heat recovery device 60 has a rectangular cross sectional shape.

According to this embodiment, with the absorber 30 and the waste heat recovery device 60 being arranged next to each other along the width direction of the ship 1 inside the funnel 6, it is possible to simplify the configuration of the exhaust gas introducing device 40, compared to a case in which the waste heat recovery device 60 and the absorber 30 are disposed away from each other. Further, since the waste heat recovery device 60 is formed to have a rectangular shape with the longitudinal direction along the width direction of the ship 1, dead space is less likely to be formed inside the funnel 6 having the longitudinal direction along the width direction of the ship 1, and thus the arrangement efficiency is improved.

In some embodiments, as shown in FIGS. 3 to 5 described above, the absorber 30 may further include an exhaust gas introducing unit 34 having a first end portion 34a connected to the exhaust gas introducing port 33 of the absorber body unit 32, and extending upward from the first end portion 34a toward the second end portion 34b.

In the depicted embodiment, the exhaust gas introducing unit 34 has a quadrilateral cross sectional shape, and so does the exhaust gas introducing port 33. Further, the exhaust gas introducing unit 34 includes an oblique portion 34A extending obliquely upward from the exhaust gas introducing port 33 of the absorber body unit 32, and a vertical portion 34B extending upward along the vertical direction from an end portion of the oblique portion 34A. Further, to an end portion of the vertical portion 34B (the second end portion 34b of the exhaust gas introducing unit 34), the exhaust gas introducing pipe 42 described below is connected.

According to this embodiment, by connecting the exhaust gas introducing line (exhaust gas introducing pipe 42) to the second end portion 34b of the exhaust gas introducing unit 34, it is possible to introduce exhaust gas into the absorber 30 disposed in a small space inside the funnel 6.

In some embodiments, as shown in FIGS. 3 to 5, the above described exhaust gas introducing device 40 includes an exhaust gas introducing pipe 42 extending along the width direction of the ship 1 from the waste heat recovery device 60 toward the second end portion 34b of the exhaust gas introducing unit 34, and auxiliary exhaust gas introducing pipes 44a to 44d connected to the exhaust gas introducing pipe 42, for introducing exhaust gas discharged from the auxiliary engines 14 to the absorber body unit 32 via the exhaust gas introducing pipe 42.

In the depicted embodiment, an end side of the exhaust gas introducing pipe 42 is connected to the exhaust gas discharge pipe 4 described above, and the other end side is connected to the second end portion 34b of the exhaust gas introducing unit 34 described above. Further, the exhaust gas introducing pipe 42 extends along the horizontal direction inside the funnel 6.

Further, in the depicted embodiment, an exhaust gas outlet pipe 46 extending upward inside the funnel 6 and the exhaust gas introducing pipe 42 are connected to the downstream side of the exhaust gas discharge pipe 43, via an exhaust gas damper 47. Further, when the exhaust gas generation device such as the main engine 12 and the auxiliary engines 14 is stopped, the exhaust gas damper 47 opens a flow path connecting to the exhaust gas outlet pipe 46 from the exhaust gas discharge pipe 43, and closes a flow path connecting to the exhaust gas introducing pipe 42 from the exhaust gas discharge pipe 43. Further, when the exhaust gas generation device such as the main engine 12 and the auxiliary engines 14 is in operation, the exhaust gas damper 47 opens a flow path connecting to the exhaust gas introducing pipe 42 from the exhaust gas discharge pipe 43, and closes a flow path connecting to the exhaust gas outlet pipe 46 from the exhaust gas discharge pipe 43.

Further, in the depicted embodiment, the plurality of auxiliary exhaust gas introducing pipes 44a to 44d through which exhaust gas discharged from the auxiliary engines 14 flows are connected to the exhaust gas introducing pipe 42. Further, a plurality of auxiliary exhaust gas discharge pipes 48a to 48d are connected to the plurality of auxiliary exhaust gas introducing pipes 44a to 44d, respectively, via an auxiliary gas damper (not depicted). Further, when the auxiliary engines 14 are stopped, for instance, the exhaust gas damper (not shown) opens a flow path connecting to the plurality of auxiliary exhaust gas discharge pipes 48a to 48d from the plurality of auxiliary exhaust gas introducing pipes 44a to 44d respectively, and closes a flow path connecting to the exhaust gas introducing pipe 42 from each of the plurality of auxiliary exhaust gas introducing pipes 44a to 44d. Further, when the auxiliary engines 14 are in operation, the exhaust gas damper (not shown) opens a flow path connecting to the exhaust gas introducing pipe 42 from each of the plurality of auxiliary exhaust gas introducing pipes 44a to 44d, and closes a flow path connecting to the plurality of auxiliary exhaust gas discharge pipes 48a to 48d from the plurality of auxiliary exhaust gas introducing pipes 44a to 44d, respectively.

According to this embodiment, it is possible to introduce exhaust gas discharged from the main engine 12 and the auxiliary engines 14 into the absorber 30 disposed in a small space inside the funnel 6.

In some embodiments, as shown in FIG. 11 described above, the absorber body unit 32 includes a pair of longitudinal wall surfaces 32a, 32b extending parallel to each other along the longitudinal direction of the interior space 31, and a pair of lateral wall surfaces 32c, 32d extending parallel to each other along the lateral direction of the interior space 31.

According to this embodiment, the planar shape of the interior space 31 of the absorber body unit 32 is formed into a rectangular shape defined by the pair of longitudinal wall surfaces 32a, 32b and the pair of lateral wall surfaces 32c, 32d. At this time, the rectangular shape of the present embodiment includes a rectangular shape whose corner portions are processed into an R shape, or a haunched rectangular shape. When the interior space 31 of the absorber body unit 32 has such a rectangular shape, dead space is less likely to be formed in the ship, and thus the arrangement efficiency upon arrangement in a ship is improved.

Figure 7A:
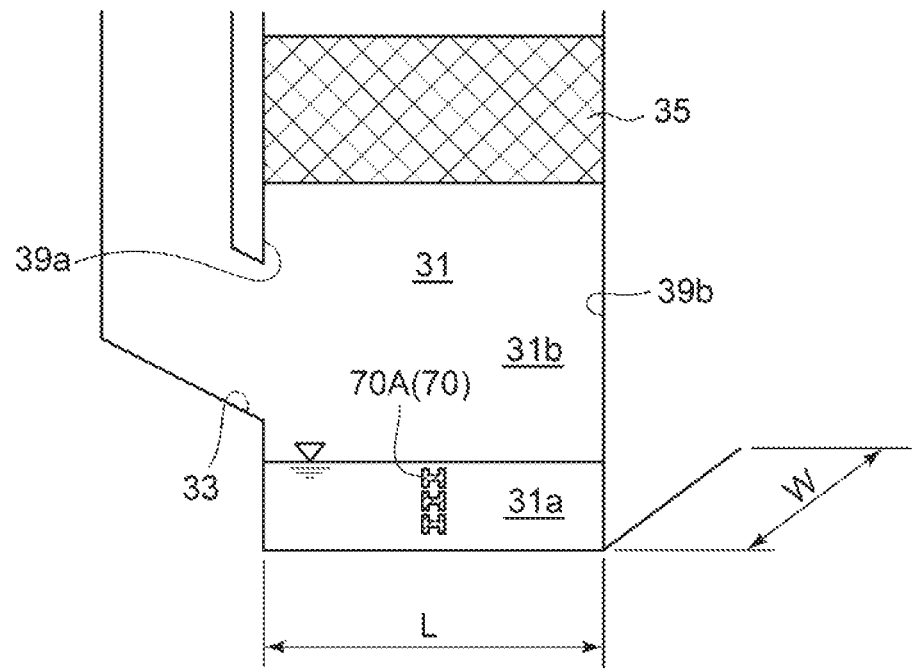
FIGS. 7A and 7B are each a diagram for describing a traverse member disposed in the storage space of the absorber main unit, in a ship desulfurization device according to an embodiment of the present invention.
Figure 7B:
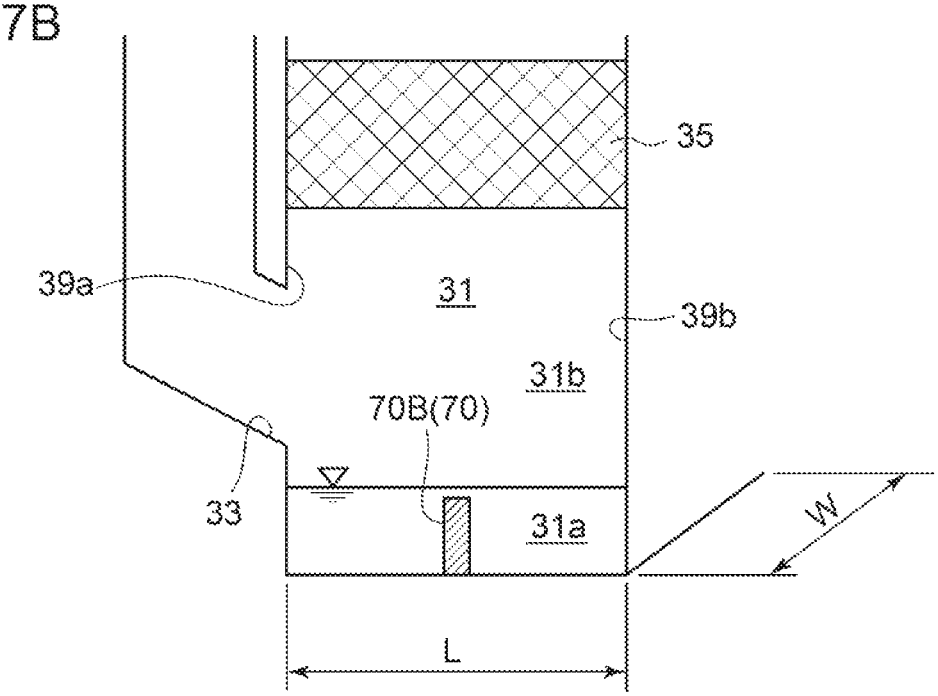

FIGS. 7A and 7B are each a diagram for describing a traverse member disposed in the storage space of the absorber body unit in a ship desulfirization device according to an embodiment of the present invention.

In some embodiments, as shown in FIG. 5 described above, a storage space 31a storing a cleaning liquid after being sprayed over exhaust gas introduced into the interior space 31 is formed in the absorber body unit 32. Further, as shown in FIGS. 7A and 7B the absorber body unit 32 includes a traverse member 70 connecting a pair of longitudinal wall surfaces 32a, 32b (see FIG. 11), and traversing the storage space 31a along the lateral direction of the interior space 31.

According to this embodiment, when sloshing occurs due to rolling of the ship 1, which is heavy surge in the surface of the cleaning liquid stored in the storage space 31a, for instance, it is possible to suppress the surge of the liquid surface with the traverse member 70. Further, with the traverse member 70 connecting the pair of longitudinal wall surfaces 32a, 32b, it is possible to improve the strength of the absorber body unit 32 having the interior space 31 with a rectangular shape.

In some embodiments, as shown in FIG. 7A, the above described traverse member 70 includes a traverse beam member 70A having an elongated shape.

In the depicted embodiment, the traverse beam member 70A includes an H-shape steel beam having an H-shaped cross section, for instance, and a plurality of (three) stages of H-shaped steel beams are disposed in the substantially center position in the longitudinal direction of the interior space 31, at intervals from one another in the up-down direction. Further, in some embodiments, the traverse beam member may be a beam member with a cross section having an I shape, an L shape, a T shape, or a tubular shape.

According to this embodiment, with the traverse beam member 70A having an elongated shape, it is possible to achieve the effect to reinforce the absorber body unit 32 and the effect to suppress sloshing described above. Further, according to this embodiment, the reinforcement effect for the absorber body unit 32 is particularly enhanced.

In some embodiments, as shown in FIG. 7B, the above described traverse member 70 includes a sheeting member 70B having a flat plate shape.

In the depicted embodiment, the sheeting member 70B is formed by a non-hole plate including no hole formed on the plate surface, and is disposed in the substantially center position in the longitudinal direction of the interior space 31. Alternatively, the sheeting member 70B may be a perforated plate with a plurality of holes formed on the plate surface.

According to this embodiment, with the sheeting member 70B having a flat plate shape, it is possible to achieve the effect to reinforce the absorber body unit 32 and the effect to suppress sloshing described above. Further, according to this embodiment, the effect to suppress sloshing is particularly enhanced.

Further, although not depicted, the traverse member 70 described above may include both of the traverse beam member 70A and the sheeting member 70B.

In some embodiments, as shown in FIG. 5 described above, the ship desulfurization device 20 further includes a spraying device 38 (38A) for spraying the cleaning liquid over exhaust gas introduced into the interior space 31 of the absorber body unit 32. Further, the spraying device 38A includes a longitudinal spray pipe 38a1 extending parallel to each of the pair of longitudinal wall surfaces 32a, 32b (see FIG. 11), and a plurality of spray nozzles 38a2 disposed on the longitudinal spray pipe 38a1, in the interior space 31 of the absorber body unit 32.

In some embodiments, a single longitudinal spray pipe 38a1 may be disposed in the substantially center position in the lateral direction of the interior space 31. Further, in some embodiments, a plurality of longitudinal spray pipes 38a1 may be disposed at regular intervals in the lateral direction of the interior space 31.

According to this embodiment, it is possible to provide a constant distance between the longitudinal wall surfaces 32a, 32b and each of the plurality of spray nozzles 38b disposed on the same longitudinal spray pipe 38a1. Accordingly, it is possible to spray the cleaning liquid uniformly in the interior space 31, and thus it is possible to suppress the negative effect of uneven spraying of the cleaning liquid due to swaying (rolling, pitching, yawing) of the ship 1.

Figure 8:
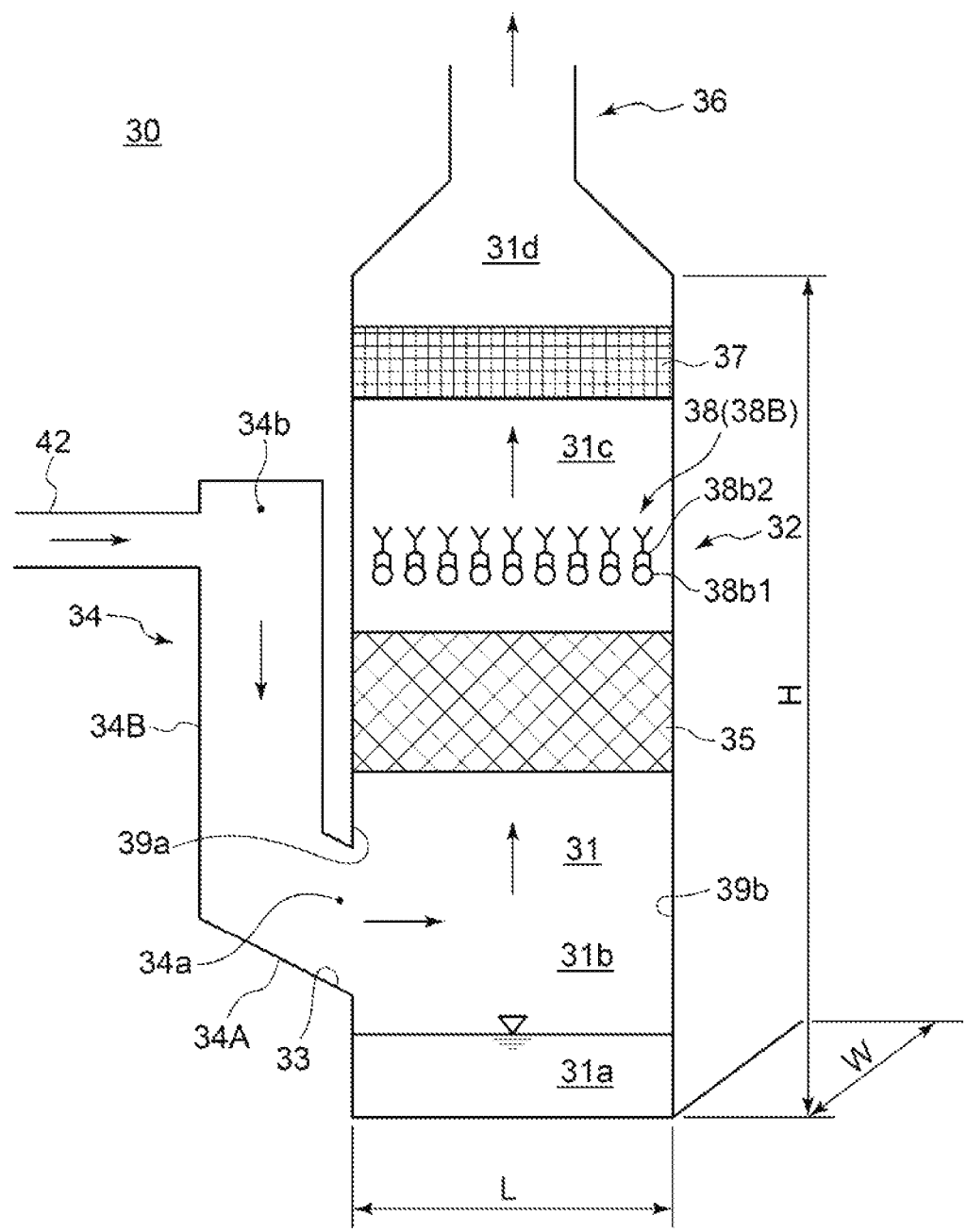
FIG. 8 is a schematic diagram of an absorber of a ship desulfurization device according to an embodiment of the present invention.

FIG. 8 is a schematic diagram of an absorber of a ship desulfurization device according to an embodiment of the present invention. The absorber 30 shown in FIG. 8 is different from the absorber 30 shown in FIG. 5 only in the configuration of the spraying device 38. Thus, the same component is associated with the same reference numeral and not described in detail.

In some embodiments, as shown in FIG. 8 described above, the ship desulfurization device 20 further includes a spraying device 38 (38B) for spraying the cleaning liquid over exhaust gas introduced into the interior space 31 of the absorber body unit 32. Further, the spraying device 38B includes a plurality of lateral spray pipes 38b1 extending parallel to each of the pair of lateral wall surfaces 32c, 32d (see FIG. 11) at regular intervals, and at least one spray nozzle 38b2 disposed on each of the lateral spray pipes 38b1, in the interior space 31 of the absorber body unit 32.

Further, in some embodiments, a plurality of longitudinal spray pipes 38b2 may be disposed at regular intervals on each of the plurality of lateral spray pipes 38b1. Further, in some embodiments, the plurality of spray nozzles 38b2 disposed on adjacent lateral spray pipes 38b1 may be offset so as not to overlap in the lateral direction. In some embodiments, the plurality of longitudinal spray nozzles 38b2 may be disposed on the plurality of lateral spray pipes 38b1 in a staggered pattern in a planar view.

According to this embodiment, it is possible to set an equal spraying area for the spray nozzles 38b2 disposed on each of the plurality of lateral spray pipes 38b1. Accordingly, it is possible to spray the cleaning liquid uniformly in the interior space 31, and thus it is possible to suppress the negative effect of uneven spraying of the cleaning liquid due to swaying (rolling, pitching, yawing) of the ship 1.

The embodiments of the present invention have been described above. However, the present invention is not limited thereto, and various modifications may be applied as long as they do not depart from the object of the present invention. While the ship desulfurization device of the present invention can be suitably applied to an ultra large container ship (ULCS) having a container capacity load of 10,000 TEU or more, for instance, it can be also applied to a ship having a container capacity load less than 10,000 TEU, that is called a large-size, or a middle/small-size ship.

DESCRIPTION OF REFERENCE NUMERALS

1 Ship
2 Hull
3 Upper deck
4 Accommodation house
6 Funnel
8, 8A, 8B Bulkhead
9 Container
10 Engine room
12 Main engine
14 Auxiliary engine
20 Ship desulfurization device
30 Absorber
31 Interior space
31a Storage space
31b Lower interior space
31c Upper interior space
31d Outlet-side interior space
32 Absorber body unit
32a, 32b Longitudinal wall surface
32c, 32d Lateral wall surface
33 Exhaust gas introducing port
34 Exhaust gas introducing unit
34A Oblique portion
34B Vertical portion
34a First end portion
34b Second end portion
35 Packed layer
36 Exhaust gas discharge unit
37 Mist eliminator
38, 38A, 38B Spraying device
38a1 Longitudinal spray pipe
38a2 Spray nozzle
38b1 Lateral spray pipe
38b2 Spray nozzle
39a Lateral end portion of first side
39b Lateral end portion of second side
40 Exhaust gas introducing device
42 Exhaust gas introducing pipe
43 Exhaust gas discharge pipe
44a to 44d Auxiliary exhaust gas introducing pipe
45 Exhaust gas inlet pipe
46 Exhaust gas outlet pipe
48a to 48d Auxiliary exhaust gas discharge pipe
50 Sea-water supplying device
52 No. 1 sea chest
52a Discharged water dilution pump
54 No. 2 sea chest
54a Sea-water supply pump
56 Sea-water introducing pipe 58 Sea-water supply pipe
60 Waste heat recovery device
70 Traverse member
70A Traverse beam member
70B Sheeting member

The invention claimed is:

1. A ship desulfrization device for desulfurizing exhaust gas discharged from an exhaust gas generation device mounted to a ship, the ship desulfuization device comprising:
   an absorber including an absorber body unit defining an interior space having a longitudinal direction and having an exhaust gas introducing port formed on an end portion of the absorber body unit with respect to the longitudinal direction, the exhaust gas introducing port being in communication with the interior space; and
   an exhaust gas introducing device for introducing exhaust gas discharged from the exhaust gas generation device to the absorber body unit,
   wherein, when L is a maximum length of the interior space of the absorber body unit with respect to the longitudinal direction, and W is a maximum width of the interior space of the absorber body unit with respect to a lateral direction that is orthogonal to the longitudinal direction,
   a ratio (W:L) of the maximum width W to the maximum length L is within a range of 1:X, where $1.1 < X \leq 6.0$.

2. The ship desulfurization device according to claim 1, wherein the ratio (W:L) of the maximum width W to the maximum length L is within a range of 1:X, where $1.5 < X \leq 2.0$.

3. The ship desulfurization device according to claim 1, wherein the absorber is mounted to the ship so that the longitudinal direction of the interior space of the absorber body unit is along a width direction of the ship.

4. The ship desulfurization device according to claim 3, wherein the ship comprises a funnel for releasing exhaust gas discharged from the exhaust gas generation device to outside, the funnel including a cylindrical shape having a longitudinal direction along the width direction of the ship, and
   wherein the absorber is disposed inside the funnel.

5. The ship desulfurization device according to claim 4, wherein a waste heat recovery is disposed inside the funnel, for recovering thermal energy from exhaust gas discharged from the exhaust gas generation device, and
   wherein the absorber is disposed next to the waste heat recovery device in the width direction of the ship.

6. The ship desulfurization device according to claim 5, wherein the absorber further includes an exhaust gas introducing unit having a first end portion connected to the exhaust gas introducing port of the absorber body unit, the exhaust gas introducing unit extending upward from the first end portion toward a second end portion.

7. The ship desulfurization device according to claim 6, wherein the exhaust gas generation device includes a main engine and an auxiliary engine, and
   wherein the exhaust gas introducing device includes:
      an exhaust gas introducing pipe extending along the width direction of the ship from the waste heat recovery device toward the second end of the exhaust gas introducing unit; and
      an auxiliary exhaust gas introducing pipe connected to the exhaust gas introducing pipe, for introducing exhaust gas discharged from the auxiliary engine into the absorber body unit via the exhaust gas introducing pipe.

8. The ship desulfurization device according to claim 1, where the absorber body unit includes:
   a pair of longitudinal wall surfaces extending in parallel to each other along the longitudinal direction of the interior space; and
   a pair of lateral wall surfaces extending in parallel to each other along the lateral direction of the interior space.

9. The ship desulfurization device according to claim 8, wherein the absorber body unit includes a storage space formed therein, the storage space storing a cleaning liquid after being sprayed over the exhaust gas introduced into the interior space, and
   wherein the absorber body unit includes a traverse member which connects the pair of longitudinal wall surfaces and which traverses the storage space along the lateral direction of the interior space.

10. The ship desulfurization device according to claim 9, wherein the traverse member comprises a traverse beam member having an elongated shape.

11. The ship desulfurization device according to claim 9, wherein the traverse member comprises a sheeting member having a flat plate shape.

12. The ship desulfurization device according to claim 8, further comprising a spraying device for spraying a cleaning liquid over the exhaust gas introduced into the interior space of the absorber body unit,
   wherein the spraying device includes:
      a longitudinal spray pipe extending parallel to each of the pair of longitudinal wall surfaces in the interior space of the absorber body unit; and
      a plurality of spray nozzles disposed on the longitudinal spray pipe.

13. The ship desulfurization device according to claim 8, further comprising a spraying device for spraying a cleaning liquid over the exhaust gas introduced into the interior space of the absorber body unit,
   wherein the spraying device includes:
      a plurality of lateral spray pipes extending parallel to each of the pair of lateral wall surfaces in the interior space of the absorber body unit, the lateral spray pipes arranged at regular intervals; and
      at least one spray nozzle disposed on each of the plurality of lateral spray pipes.

14. The ship desulfurization device according to claim 1, wherein the exhaust gas generation device includes a main engine, and
   wherein an exhaust gas amount of the main engine is at least 200,000 $Nm^3/h$.

15. The ship desulfurization device according to claim 1, wherein the ship comprises a container ship having a container load capacity of at least 10,000 TEU.

16. A ship comprising the ship desulfurization device according to claim 1.

* * * * *